US006595412B2

(12) United States Patent
Manduley

(10) Patent No.: US 6,595,412 B2
(45) Date of Patent: Jul. 22, 2003

(54) METHOD FOR CALCULATING INDICIA FOR MAILPIECES

(75) Inventor: Flavio M. Manduley, Woodbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/848,528

(22) Filed: May 3, 2001

(65) Prior Publication Data

US 2002/0190117 A1 Dec. 19, 2002

(51) Int. Cl.[7] .................................................. G06F 17/00
(52) U.S. Cl. ........................................ 235/375; 235/378
(58) Field of Search ................................. 235/375, 378, 235/376; 705/401, 402, 405, 408

(56) References Cited

U.S. PATENT DOCUMENTS 4,535,419 A * 8/1985 Dlugos et al. ........... 177/25.15
4,713,769 A * 12/1987 Hills et al. .................. 705/404
4,802,117 A * 1/1989 Chrosny et al. ............ 705/405
5,758,330 A * 5/1998 Brown ....................... 705/405

* cited by examiner

*Primary Examiner*—Karl D. Frech
(74) *Attorney, Agent, or Firm*—Ronald Reichman; Angelo N. Chaclas

(57) ABSTRACT

A method for having a security device, having official ascending/descending registers, provide indicia to be printed on mailpieces so as to take advantage of periods in the security device duty cycle when the security device is normally inactive, including the steps of performing a partial pre-calculation of an indicia taking into account only non-varying and slowly varying components of the indicia and reusing the partial calculation in a succession of full pre-calculations performed during a rest cycle of the security device. In some applications, the method includes having the security device perform a partial pre-calculation of an indicia taking into account only non-varying and slowly varying components of the indicia; having the security device set aside a location in a scratch pad memory of the security device for use as virtual ascending/descending registers and having the security device set the virtual ascending/descending registers to the current value of the official ascending/descending registers.

7 Claims, 4 Drawing Sheets

( PROIR ART )

METHOD FOR CALCULATING INDICIA FOR MAILPIECES

TECHNICAL FIELD

The present invention pertains to the field of postage metering, and more particularly, to machines for printing indicia (postage) on mailpieces.

BACKGROUND OF THE INVENTION

According to the prior art, a mailing machine or postage meter may include a security portion or security device, a printing portion and a computing portion. A postal security device ("PSD") may be used as the security portion of a mailing machine. When the security device receives a request to print a postal indicia on a mailpiece, the mailing machine will calculate the information to be indicated in the indicia, even though some of the information is known (such as the postage meter identifier and, usually, the date of mailing) before the request to print the indicia is received and so may be calculated beforehand. Pre-calculating the information of an indicia that is known before receiving the mailpiece for which the next indicia is to be provided would speed processing time (throughput) for the mailing machine. However, the indicia also bears information that varies from mailpiece to mailpiece, such as the ascending register value (which is used to keep track of the total postage printed by the postage meter), the descending register value (which is used to keep track of the postage remaining in the postage meter), the piece count (which is the total of all pieces processed by a PSD since installation), and the digital signature set out by U.S. Postal Service regulations.

According to the prior art, upon receiving a request to print an indicia on a mailpiece, the security device of a mailing machine calculates the indicia, calculates the encryption, generates a digital signature, and performs the accounting for the transaction (the purchase of postage). A mailing machine also includes a printhead, and once the indicia for a mailpiece is calculated, a print command including the indicia is then transmitted from the security device to the printhead. Thus, between each print command, the security device makes a complete indicia calculation.

Security devices, therefore, are tailored (in hardware and software) to meet the throughput requirements of a particular machine, since the calculation of the indicia is done in-line with the other steps followed in printing an indicia on a mailpiece, i.e., the calculation is on the critical path of the activity of printing indicia on mailpieces. Therefore, security devices are designed according to the throughput requirements of a mailing machine, and thus the same security device does not have the same efficiency for different meter architectures. For example, some mailing machines are designed to perform indicia calculations in 750 milliseconds (corresponding to a throughput of 90 mailpieces/minute for such a machine), and others are designed to perform indicia calculations in 250 milliseconds (corresponding to a throughput of 240 mailpieces/minute for such a machine).

It would be advantageous to take advantage of the fact that some of the information included in an indicia could be pre-calculated, at least if the pre-calculations could be done off-line, i.e., so as not to be on the critical path of all of the tasks to be performed in printing the indicia on a mailpiece. Pre-calculating whatever parts of an indicia can be pre-calculated off the critical path would allow using the same security device in machines designed for some maximum throughput as well as for machines designed for lower throughput.

SUMMARY OF THE INVENTION

Accordingly, the present invention provides a method for having a security device having official ascending/descending registers, provide indicia to be printed on mailpieces, the method including the steps of having the security device set a current postage value; having the security device perform a partial pre-calculation of an indicia taking into account only non-varying and slowly varying components of the indicia; having the security device set aside a location in a scratch pad memory of the security device for use as virtual ascending/descending registers; having the security device set the virtual ascending/descending registers to the current value of the official ascending/descending registers; and having the security device perform a full pre-calculation based on the partial pre-calculation using the current postage value and saving the result of the full pre-calculation in another location in the scratch pad memory.

In a further aspect of the invention, the method includes the further steps of having the security device update the values of the virtual ascending/descending registers; having the security device test to determine whether a request for an indicia has been made; and, if a request for a new indicia has not been made, and if scratch pad memory is available to hold the result of a new indicia calculation, then having the security device repeat the method beginning with the step of having the security device perform a full pre-calculation based on the partial pre-calculation.

In another further aspect of the invention, the steps are performed by the security device for both a first mailing machine and a second mailing machine.

From another perspective, the invention provides a method for having a postal security device (PSD), having official ascending/descending registers, provide indicia to be printed on mailpieces, including the steps of performing a partial pre-calculation of an indicia taking into account only non-varying and slowly varying components of the indicia; and reusing the partial calculation in a succession of full pre-calculations performed during a rest cycle of the PSD.

BRIEF DESCRIPTION OF THE DRAWINGS

The above and other objects, features and advantages of the invention will become apparent from a consideration of the subsequent detailed description presented in connection with accompanying drawings in which.

DETAILED DESCRIPTION

Figure 1:
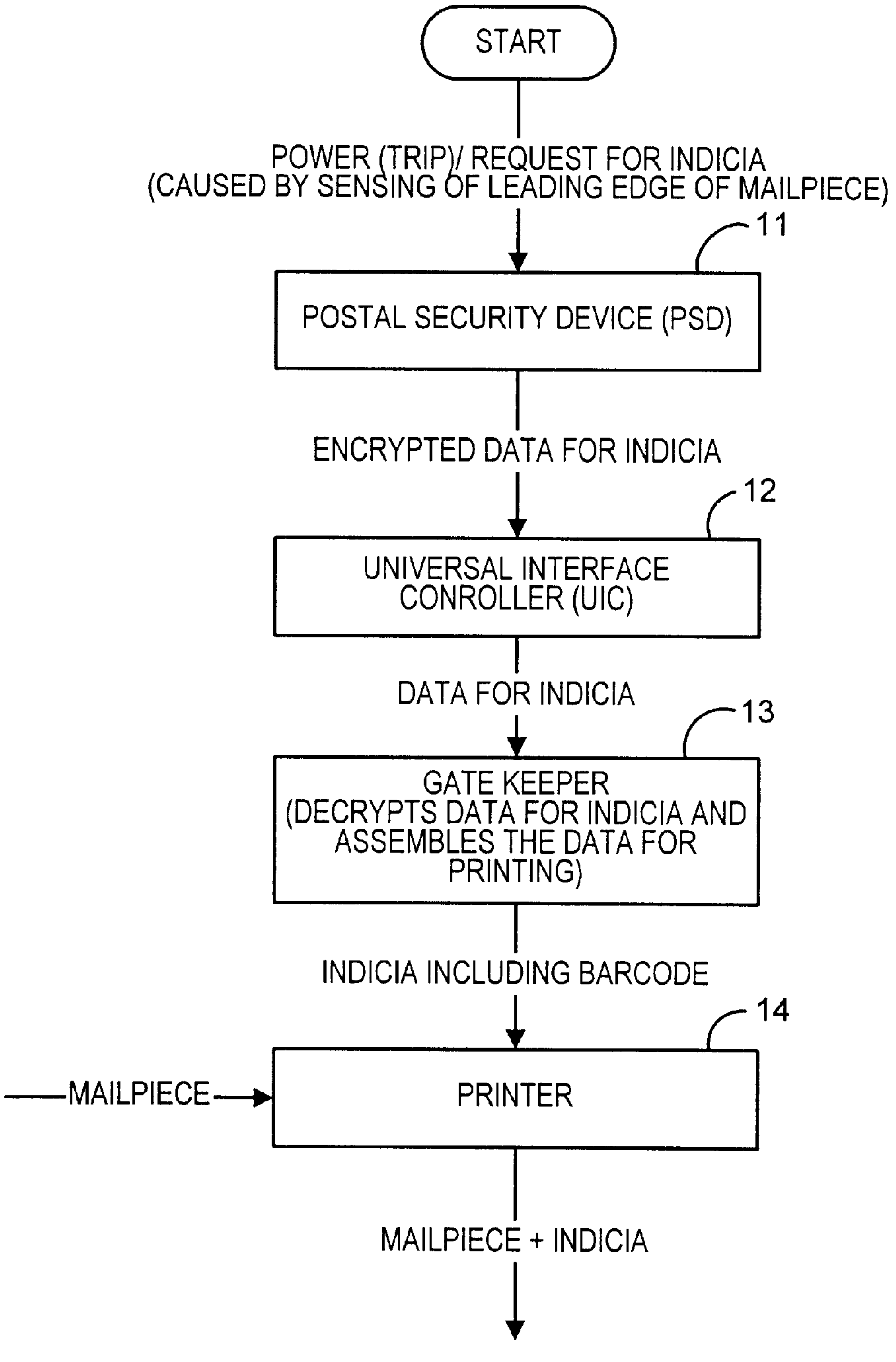
FIG. 1 is a block diagram/flow diagram showing the cooperation between various components of a mailing machine for printing indicia on mailpieces.

According to the invention, to improve the throughput capability of a mailing machine for calculating indicia for mailpieces and for printing the indicia on the mailpieces (an indicia being all of the information printed on the upper right hand face of a mailpiece), at least some of the calculation of the indicia is removed from the critical path of the steps being performed by the mailing machine. The inventor has modified a mailing machine with a designed-in processing time (based on the speed of the processor used with the security device) for calculating indicia of 750 ms to instead process some indicia in as little as 250 ms, reducing the time by a factor of three. Thus, such a processor can now be used in mailing machines with higher throughput requirements than were originally intended, allowing less expensive security devices to be used in the mailing machines. Alternatively, mailing machines with a specified processor for use by the security device can now print indicia on mailpieces at a higher throughput speed, without any hardware modification.

According to the invention, a partial calculation of an indicia is performed, using the non-varying indicia information (such as the identifier) and slowly varying indicia information (such as the date), and the partial calculation is then used as the basis for a succession of full indicia calculations, calculations that are made assuming a postage value (postage), before an actual request for an indicia is input to the mailing machine. (The value assumed for the postage value is either a default value or a value based on what is here called profiling, meaning for example the most often used postage value, or the last value used since batches of the same postage value are often run, or the value most often used at a particular time of day.) A scratch memory pad is used to hold the results of the full pre-calculations (the results of the partial pre-calculations supplemented in the preferred embodiment by an identifier of the algorithm used in generating the digital signature, the version number of the algorithm, the certificate serial number, the originating address of the customer/user, and a software identifier); the scratch pad memory is assumed to be included in a mailing machine that is to use the invention. An area of scratch pad memory is also used for what are called here "virtual A/D registers" (and other variable registers not expressly discussed here). For each full pre-calculation, the virtual A/D registers, which are set to the values of the official A/D registers before beginning the pre-calculations, are adjusted (as if each pre-calculated indicia were being printed as soon as it is calculated). The pre-calculations are performed during a rest cycle of the mailing machine so as not to be on the critical path.

A rest cycle is any time interval in a mailing machine duty cycle in which the security device would be inactive if it were not pre-calculating indicia according to the invention. For example, a rest cycle can be said to occur when a mailing machine is first turned on in the morning, or a rest cycle can be an interval between batches of envelopes, or while a mailing machine is printing an indicia on an envelope (during which time the PSD would not be processing except according to the invention). The pre-calculation of the invention could be done during any such rest cycle and also at turn off time (by keeping power in the machine long enough to pre-calculate the values and store the values in the scratch pad).

According to the invention, as many full pre-calculations are performed as either the time available permits, or until the scratch pad memory set aside for holding the pre-calculated indicia is full. If an operator enters a different postage value from what was assumed in making the pre-calculations, all of the pre-calculated indicia are discarded, and the virtual A/D registers are reset to the values of the official A/D registers. During the next rest cycle (or at power down, as explained above), a new set of pre-calculations is performed, and the virtual A/D registers are adjusted for each pre-calculated indicia, starting from the values of the official A/D registers.

With the present invention, there is enough spare time created between print cycles that a postage meter using the invention can be adapted, without hardware changes, to mailing machines with significantly higher throughput requirements than those for which the postage meter was originally intended. Alternatively, because of the spare time created by the invention, a single security device performing indicia calculations according to the invention can calculate indicia for more than one mailing machine, the calculations then being performed in a multiplexing mode.

Thus, according to the present invention, the PSD of a mailing machine performs successive full pre-calculations of indicia (which may have to be discarded if the assumptions on which the pre-calculations are based are not correct for the next envelope to be processed) and so are already available when a next envelope or a next batch of envelopes is processed by the mailing machine.

Referring now to FIG. 1, a mailing machine for printing an indicia on a mailpiece is shown as including a security device or PSD 11, which in response to a power or trip signal, caused by the leading edge of an envelope to be processed tripping a sensor, begins a new machine cycle, ultimately providing encrypted indicia information for the envelope to be processed; a universal interface controller (UIC) 12, for interfacing the PSD to a gate keeper 13, which decrypts the (encrypted) indicia information and provides the indicia in a form suitable for printing, and a printer (or printhead) 14, which prints the indicia based on the communication it receives from the gate keeper.

According to the invention, the PSD pre-calculates and encrypts the indicia information for the next mailpiece. In the usual scenario, an operator provides a postage value via a user interface (not shown). Assuming that the postage value set by the operator is the value assumed in the pre-calculation, the PSD has on hand (in the scratch pad memory) the encrypted indicia information that will be used to print an indicia on the envelope. Then, in response to the power or trip signal, the PSD executes a so-called debit, i.e. the PSD subtracts the postage value (provided via a user interface, not shown) from the descending register and adds the same value to the ascending register. Next, the PSD transmits the encrypted indicia information to the UIC. Finally, the PSD completes the signature and sends a transmit data signal (including the signature) via the UIC 12 to the gate keeper 13. In response to the transmit data signal, the gate keeper generates a two-dimensional barcode, verifies the keys of the signature, and sends the signature to the printer to be printed on the mailpiece.

Figure 2A:
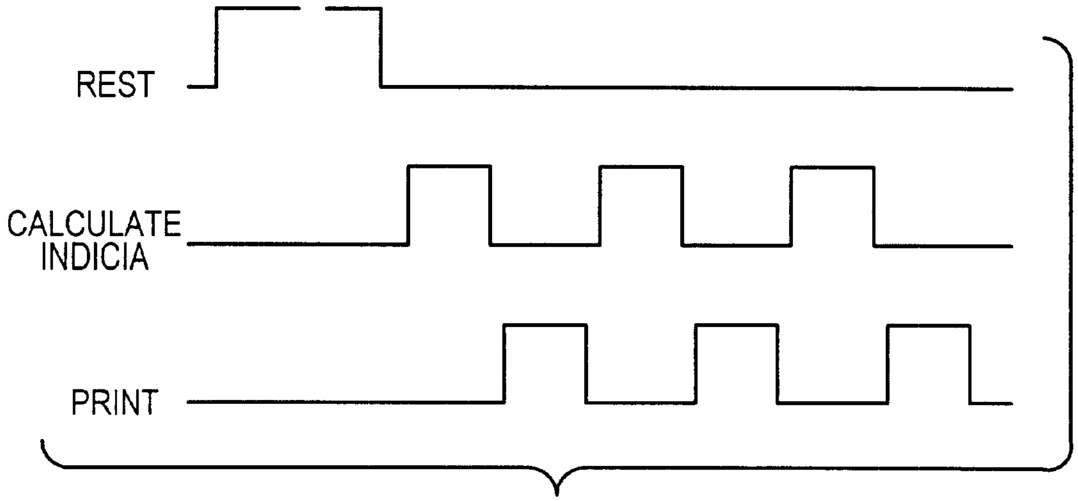
FIG. 2A is a prior art timing diagram for a mailing machine used for printing indicia on mailpieces.

Referring now to FIG. 2A, a timing graph of a machine cycle (for a mailing machine) according to the prior art is shown as including a rest cycle (for example when the mailing machine is in standby mode), followed by a succession of calculating intervals and printing intervals in which, first, the next indicia to be printed is calculated and then it is printed. According to such a timing graph, the calculation of the next indicia is on the critical path of the mailing machine; the time required to calculate the next indicia delays the printing of the next indicia.

Figure 2B:
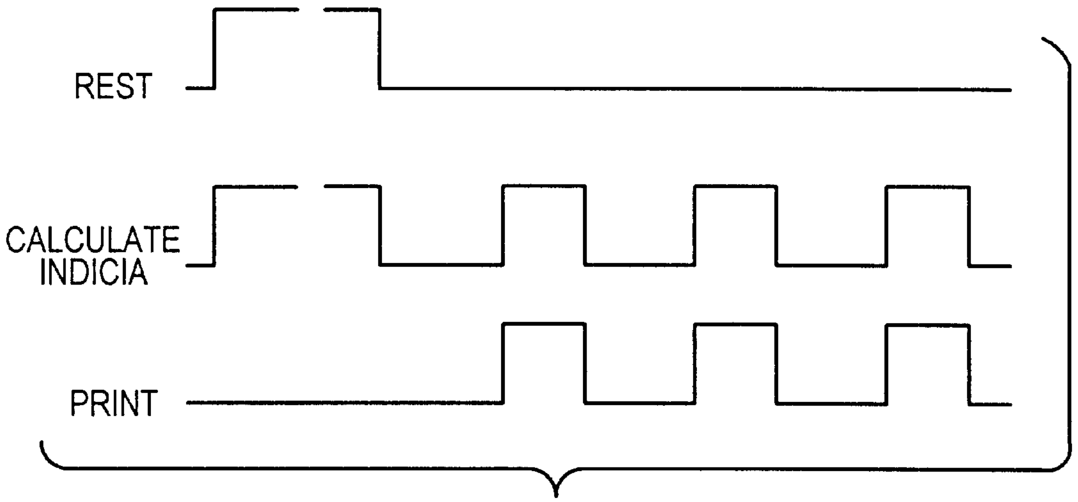
FIG. 2B is a timing diagram for a mailing machine used for printing indicia on mailpieces according to the invention.

Referring now to FIG. 2B, a timing graph according to the invention is shown as again including a rest cycle, but one during which one or more indicia are calculated (using new or default postage values). In addition, while an indicia is being printed on one mailpiece, indicia for subsequent mailpieces are being calculated (again using new or default postage values). Therefore, the processing time needed for calculating an indicia is removed from the critical path; indicia calculations are performed both during the rest cycle and while the mailing machine is printing indicia on mailpieces. (The intervals on the timing graph of FIG. 2B between printing could be shorter, but for ease of comparison with the prior art, these intervals are shown to be the same as in the prior art.) Therefore, the mailing machine does not have to wait after printing an indicia on a mailpiece to print an indicia on the next mailpiece.

Table 1 presents another way of comparing the machine cycle of a mailing machine according to the present invention and according to the prior art.

TABLE 1

Comparison of present invention machine cycle (timing diagram) with prior art.

| Step in Prior Art Duty Cycle | Step in Duty Cycle According to the Invention |
|---|---|
| Stand by. | Stand by. |
| Pre-calculate fixed components of indicia. | Using profile, pre-calculate full indicia (both fixed and variable components). Load calculations into scratch pad until scratch pad memory is full. |
| Postage selected. | Postage selected. If selected postage is equal to profile-based postage, then proceed. If not, then recalculate indicia and hold envelopes. |
| Envelopes loaded. Leading edge of envelope sensed. | |
| Calculate variable components of indicia, and add it to variable components. | Calculate as much as possible for freed up scratch pad memory. |
| Deduct postage from descending register and add it to ascending register. Send full indicia to UIC. | Deduct postage from descending register and add it to ascending register. Send full indicia to UIC. Continue to calculate until next leading edge is sensed. |
| Sense next leading edge or postage selected, and continue as above from that event. | Sense next leading edge or postage selected, and continue as above from that event. |

Figure 3:
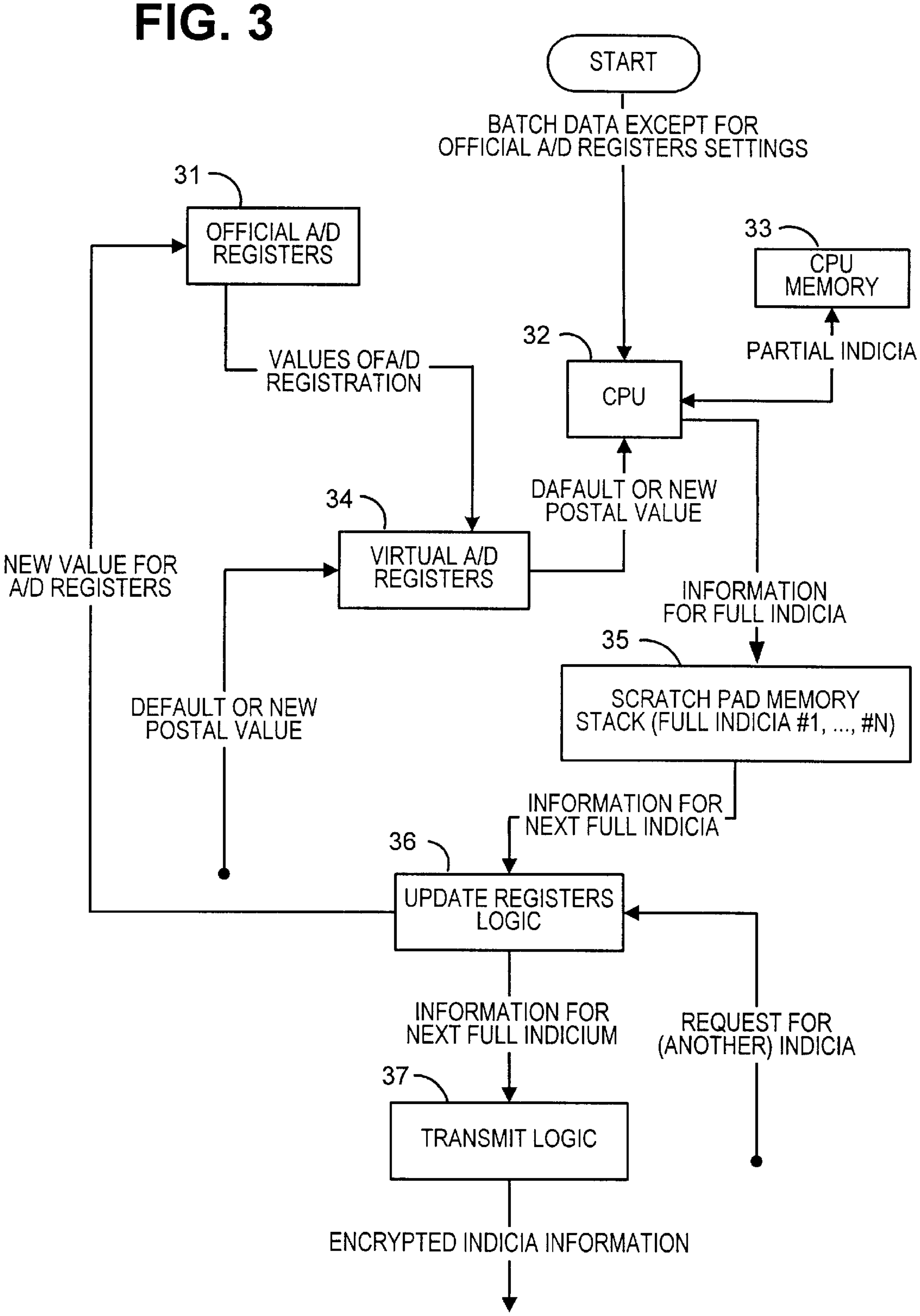
FIG. 3 is a block diagram/flow diagram for the components of the postal security device of the mailing machine of FIG. 1.

Referring now to FIG. 3, a block diagram is shown of some of the relevant components of a mailing machine operating according to the present invention. According to the block diagram, the mailing machine includes official ascending/descending (A/D) registers 31 for holding the cumulative postage issued by the mailing machine and the postage remaining to be issued by the mailing machine (before it is refilled), as well as other so-called variable official registers not expressly discussed here, such as a piece count register for keeping track of the total number of mailpieces processed by the mailing machine. The values of the official A/D registers are changed, in response to a request indicia signal, before providing an indicia in response to the signal. After updating the official A/D registers, an indicia is transmitted to the printer 14 (FIG. 1) by a transmit logic module 37.

According to the invention, the slowly varying and non-varying information that is part of an indicia (i.e., in the preferred embodiment, all information except for the A/D register values) is read by a microprocessor (CPU) 32, which then pre-calculates a partial indicia (partial in that it does not include the values of the A/D registers) and stores it in a memory 33. Virtual A/D registers 34 (a set of memory locations of the scratch memory pad, which is assumed to come with the mailing machine) hold the current values of the official A/D registers. The new or default postage values (or postage values based on some profiling as described above, such as the most often used postage value/postage) are saved in the scratch pad 35. The CPU reads the current postage value from the scratch pad and reads the partially pre-calculated indicia from the scratch pad memory; it then pre-calculates a full indicia (by adding to the partial pre-calculated information the information that necessarily changes with each mailpiece, including the values of the A/D registers, the piece count, and the digital signature) and writes it to a scratch pad memory stack 35. The CPU repeatedly pre-calculates successive full indicia using the same partially pre-calculated indicia, stores each new full indicia in the scratch pad memory stack 35, and updates the virtual A/D registers 34 until either the scratch pad memory stack is full or the end of the rest cycle is reached. When a "request for indicia" signal is received, an update registers logic module 36 is triggered to pull the pre-calculated indicia information from the scratch pad memory (first-in first-out) stack 35, update the official A/D registers 31, and provide the indicia information to the UIC/Gate keeper (see FIG. 1) via a transmit logic module 37 in encrypted form. (As explained above, the Gatekeeper assembles the encrypted information, decrypts it, and provides it to the printer.) The signal "request for indicia" is activated by the leading edge of the envelope to be processed, and the official A/D registers are updated as soon as the request for indicia signal is received. This sequence of events is required by the U.S. Postal Service to guarantee that indicia will never be printed without the official A/D registers (and other official registers) having been updated.

Figure 4:
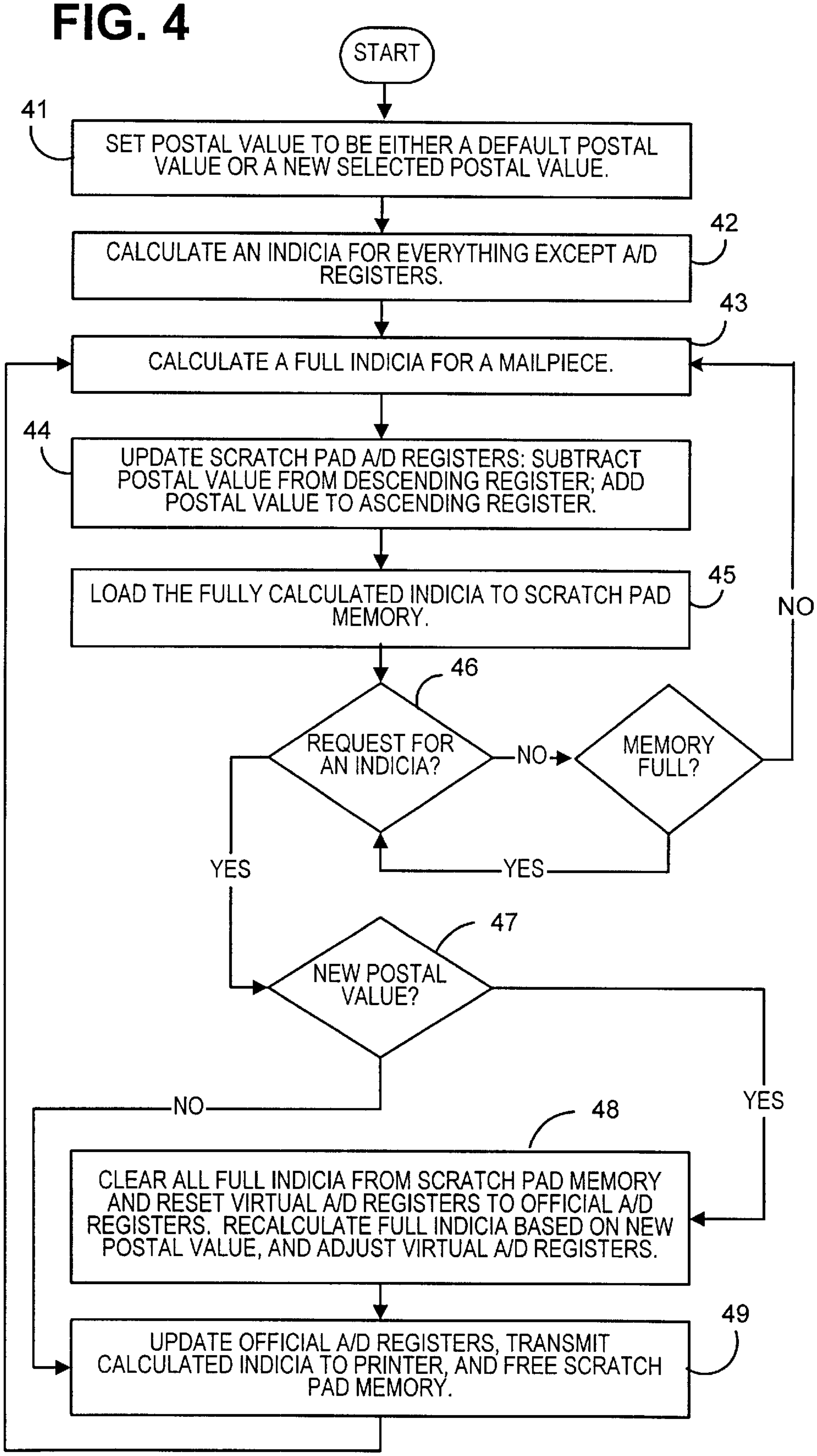
FIG. 4 is a flowchart of the preferred embodiment of the method of the invention.

Referring now to FIG. 4, a flow chart is shown of the calculation of indicia, according to the preferred embodiment of the invention, by a mailing machine having a scratch pad where partial indicia calculations can be stored and where values of the A/D registers can be stored (current as well as anticipated values of the A/D registers). In step 41, a set postal value or a default postal value is input to the calculation as the current (assumed) postage value. (Besides a postage value, a rate category may also be assumed.) In a next step 42, a partial calculation of one indicia is performed. In such a partial calculation, only the slowly varying and non-varying components of an indicia are used. The partial pre-calculation must be completed by including the changing values of the indicia, and in particular the values of the A/D registers, which change from one indicia to the next. The foregoing result is a full pre-calculation. It is possible that the postage value and even the date will change, values that are assumed in the partial pre-calculation. (An operator could input a different postage value from what was assumed in making a full pre-calculation, or the next envelope to be processed might not be processed until the next day.)

In a next step 43, the full pre-calculation is performed, providing a full indicia based on the postage value assumed in step 41. Then in a step 44, the virtual A/D registers 34 (see FIG. 3) are updated by incrementing the ascending register by the postage value, and decrementing the descending register by the same amount, and in a step 45, the full indicia is loaded to the scratch pad memory.

Next, in a decision step 46, a test is made to determine whether an indicia has been requested, i.e., to determine whether there is a mailpiece for which an indicia is to be provided. If not, then after testing to make certain that there is still scratch pad memory available to hold another indicia, another full indicia is calculated, the scratch pad registers are updated, and the full indicia is saved in scratch pad memory as above (via steps 43-45). If though, an indicia has been requested, the mailing machine determines in a decision 47 whether the request is for an indicia with the postage value set in step 41. If so, then in a step 49, the mailing machine prints the indicia and updates the official A/D registers of the mailing machine.

If, however, a new postage value is to be used (different than the postage value set in step 41), then in a step 48 the mailing machine clears all full pre-calculations stored in the scratch pad memory, resets the virtual A/D registers so as to read the same as the official A/D registers, and then recalculates a full indicia using the new postage value, starting from the partial calculation completed in step 42. Then in a step 49 PSD updates the official A/D registers and transmits the (encrypted) indicia information to the UIC (see FIG. 1) to be provided to the printhead for printing on the envelope. The PSD also then frees scratch pad memory by deleting the indicia just printed. The process then begins again using the new postage value provided as part of the request for an indicia.

It should be understood that according to the present invention, the throughput of a mailing machine can be increased not only by the method illustrated in FIG. 4, but by any method that performs a partial pre-calculation of an indicia that is then used in performing a full calculation of a series of indicia. Although in the preferred embodiment, the partial pre-calculation is performed assuming a postage value, the invention is also intended to comprehend performing a partial pre-calculation without such an assumption (i.e., so that the partially pre-calculated indicia does not include the postage value). In addition, depending on the particular application, it can be advantageous to exclude from the partial pre-calculation other information included in a full indicia such as, for example, the date.

Accordingly, it is to be understood that the above-described arrangements are only illustrative of the application of the principles of the present invention. Numerous other modifications and alternative arrangements besides those disclosed here may be devised by those skilled in the art without departing from the spirit and scope of the present invention, and the appended claims are intended to cover such modifications and arrangements.

What is claimed is:

1. A method for having a security device, having official ascending/descending registers, provide indicia to be printed on mailpieces, the method comprising the steps of:

a) having the security device set a current postage value;

b) having the security device perform a partial pre-calculation of an indicia taking into account only non-varying and slowly varying components of the indicia;

c) having the security device set aside a location in a scratch pad memory of the security device for use as virtual ascending/descending registers;

d) having the security device set the virtual ascending/descending registers to the current value of the official ascending/descending registers; and e) having the security device perform a full pre-calculation based on the partial pre-calculation using the current postage value and saving the result of the full pre-calculation in another location in the scratch pad memory.

2. The method of claim 1, further comprising the steps of:

f) having the security device update the values of the virtual ascending/descending registers;

g) having the security device test to determine whether a request for an indicia has been made; and h) if a request for a new indicia has not been made, and if scratch pad memory is available to hold the result of a new indicia calculation, then having the security device repeat the method beginning with the step of having the security device perform a full pre-calculation based on the partial pre-calculation.

3. A method as in claim 1, wherein the security device also includes an official piece count register, and the method further comprises the steps of:

a) having the security device set aside a location in a scratch pad memory of the security device for use as a virtual piece count register; and b) having the security device set the virtual piece count register to the current value of the official piece count register.

4. A method as in claim 1, wherein the steps are performed by the security device for both a first mailing machine and a second mailing machine.

5. The method claimed in claim 1, wherein the security device is a Postal Security Device (PSD).

6. A method for having a postal security device (PSD), having official ascending/descending registers, provide indicia to be printed on mailpieces, the method comprising the steps of:

a) performing a partial pre-calculation of an indicia taking into account only non-varying and slowly varying components of the indicia; and b) reusing the partial calculation in a succession of full pre-calculations.

7. The method claimed in claim 6, wherein the security device is a Postal Security Device (PSD).

* * * * *